United States Patent
Dateki (10) Patent No.: US 9,025,530 B2
(45) Date of Patent: May 5, 2015

(54) WIRELESS COMMUNICATION METHOD, WIRELESS COMMUNICATION SYSTEM, BASE STATION, AND MOBILE STATION

(71) Applicant: Fujitsu Limited, Kawasaki-shi (JP)

(72) Inventor: Takashi Dateki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 13/770,574

(22) Filed: Feb. 19, 2013

(65) Prior Publication Data

US 2013/0163518 A1    Jun. 27, 2013

Related U.S. Application Data

(63) Continuation of application No. PCT/JP2010/065969, filed on Sep. 15, 2010.

(51) Int. Cl.
*H04W 4/00* (2009.01)
*H04B 7/04* (2006.01)
*H04B 7/06* (2006.01)

(52) U.S. Cl.
CPC ............ *H04B 7/0456* (2013.01); *H04B 7/0417* (2013.01); *H04B 7/0617* (2013.01); *H04B 7/0669* (2013.01); *H04B 7/063* (2013.01)

(58) Field of Classification Search
CPC .. H04B 7/0413; H04B 7/0669; H04B 7/0689; H04B 7/0691; H04L 5/0023
See application file for complete search history.

(56) References Cited

U.S. PATENT DOCUMENTS

| | | | |
|---|---|---|---|
| 8,027,407 B2* | 9/2011 | Papadopoulos | 375/299 |
| 2004/0258174 A1 | 12/2004 | Shao et al. | |
| 2005/0041751 A1* | 2/2005 | Nir et al. | 375/267 |
| 2005/0249306 A1 | 11/2005 | Chae et al. | |
| 2007/0140377 A1 | 6/2007 | Murakami et al. | |
| 2008/0037409 A1 | 2/2008 | Ogawa et al. | |
| 2009/0202014 A1* | 8/2009 | Mujtaba et al. | 375/267 |
| 2009/0213955 A1 | 8/2009 | Higuchi et al. | |
| 2010/0172421 A1 | 7/2010 | Okamura et al. | |

FOREIGN PATENT DOCUMENTS

| | | |
|---|---|---|
| JP | 2003-18127 A | 1/2003 |
| JP | 2006-510327 A | 3/2006 |
| JP | 2006-519520 A | 8/2006 |
| JP | 2007-527680 A | 9/2007 |
| JP | 2007-295549 A | 11/2007 |

(Continued)

OTHER PUBLICATIONS

International Search Report, mailed in connection with PCT/JP2010/065969 and mailed Oct. 12, 2010.

*Primary Examiner* — Yong Zhou
(74) *Attorney, Agent, or Firm* — Fujitsu Patent Center (57) ABSTRACT

A method for performing wireless communication includes performing a precoding process beforehand on a plurality of symbols at a base station; performing space block coding on the plurality of symbols at the base station after the precoding process; sending signals from a plurality of antennas of the base station; performing space block decoding on the signals received by a plurality of antennas at a mobile station; performing antenna combination and a deprecoding process on the signals at the mobile station after the signals have undergone the space block decoding; and estimating the plurality of symbols at the mobile station from the signals that have undergone the deprecoding process.

9 Claims, 4 Drawing Sheets

(56) References Cited

FOREIGN PATENT DOCUMENTS

| JP | 2007-300384 A | 11/2007 |
|---|---|---|
| JP | 2008-109697 A | 5/2008 |
| JP | 2009-100116 A | 5/2009 |
| JP | 2009-194549 A | 8/2009 |
| JP | 2009-278660 A | 11/2009 |
| JP | 2010-171734 A | 8/2010 |
| WO | WO2010/032385 A1 | 3/2010 |

\* cited by examiner

WIRELESS COMMUNICATION METHOD, WIRELESS COMMUNICATION SYSTEM, BASE STATION, AND MOBILE STATION

CROSS-REFERENCE TO RELATED APPLICATION

This patent application is based upon and claims the benefit of priority under 35 USC 120 and 365(c) of PCT application JP2010/065969 filed in Japan on Sep. 15, 2010, the entire contents of which are incorporated herein by reference.

FIELD

The present invention is related to a wireless communication method, a wireless communication system, a base station, and a mobile station for receiving, with a plurality of receiving antennas, signals transmitted from a plurality of transmitting antennas.

BACKGROUND

In recent years, small sized base stations such as home eNodeB are attracting attention. Such small sized base stations are located in households. There are base stations having access restrictions so that only specific users may use the base station. A case is considered where a cell B of a small radius formed by a small sized base station, having an access restriction, is located in a cell A having a wide rage formed by a regular base station. When a user, who is not able to connect to the cell B and is present near the cell B, attempts to perform communications with cell A, even if signals from a regular base station are received by a sufficient amount of power compared to background noise, signals of cell B become dominant interference and sufficient communication performance is not realized.

In a regular cellular system, even when a terminal moves, the connection is switched to a cell having the highest average receiving power among the surrounding cells. Accordingly, among the plural base stations from which signals are received, basically, the base station transmitting signals having the highest receiving power becomes the communication target. However, near the cell B having the above access restriction, there are cases where a low quality communication environment is formed, because interfering signals from cell B become more dominant power components than signals from cell A that is the communication target.

There is known a method referred to as Alamouti encoding as transmission diversity using plural transmitting antennas. Plural transmission symbols are encoded and transmitted from the plural antennas. There are known methods for using space block codes as resources used for the transmission, such as STBC (Space Time Block Code) using plural resources that are temporally different, and SFBC (Space Frequency Block Code) using plural frequency resources. These methods are applied in wireless communication systems such as WCDMA (Wideband-Code Division Multiple Access) and LTE (Long Term Evolution).

There is proposed a technology of improving the receiving performance when there is interference from other cells. Specifically, when components from some of the cells included in other cell interference are dominant, both the signals from other cells and signals of the self-cell are considered as antenna branches of MIMO, and are received by MIMO-MLD (Multiple Input Multiple Output-Maximum Likelihood Detection) (see, for example, Patent Document 1).

Furthermore, there is proposed a technology of relatively reducing the scale of the hardware by dividing a dividing process into plural stages. Specifically, a wireless communication device includes a receiving unit for receiving spatial multiplex signals in which different transmission signals are spatially multiplexed; a first signal dividing unit for dividing the spatial multiplex signals by performing a linear operation on the received spatial multiplex signals; and a second signal dividing unit for dividing the spatial multiplex signals that have been divided into transmission signals (see, for example, Patent Document 2).

Furthermore, there is proposed a technology for attaining reception data having good error rate properties by performing a relatively small number of operations without reducing the data transmission efficiency. Specifically, a soft decision unit makes a tentative decision to obtain modulation signals that have been divided at a division unit using an inverse matrix operation of a channel variance matrix, a signal point reduction unit uses results of the tentative decision to reduce the number of candidate signal points of the modulation signals that have been multiplexed, and the soft decision unit makes a correct decision by using the number of candidate signal points that have been reduced to obtain reception data of the modulation signals (see, for example, Patent Document 3).

Furthermore, there is proposed a wireless communication device for improving throughput of data transmission. Specifically, the wireless communication device includes plural antennas; a receiving means for receiving report signals from a communication opponent; two or more means for changing the number of data series according to two or more transmission methods among a MIMO multiplex method, a MIMO diversity method, and an adaption array antenna method, and combining these with the plural antennas; a selection means for selecting at least one of the two or more means based on the report signals; and a transmission means for reporting, to the communication opponent, the transmission method corresponding to the selected means (see, for example, Patent Document 4).

Furthermore, there is proposed a technology in which each base station transmits OFDM (Orthogonal Frequency Division Multiplexing) signals in which a pilot channel including pilot signals, a control channel including at least control information needed for communicating with a mobile station, and a traffic channel including information of user data, are multiplexed; and a mobile station receives request signals s from a self-cell base station and interference signals u from another cell base station 2, detects request signals s and interference signals u using a signal division technology in MIMO such as MLD based on channel information acquired from the pilot signals and received control information, and removes interference signals from the other cell base station and divides request signals s from the self-cell base station (see, for example, Patent Document 5).

Patent Document 1: Japanese Laid-Open Patent Publication No. 2007-300384
Patent Document 2: Japanese Laid-Open Patent Publication No. 2007-295549
Patent Document 3: Japanese Laid-Open Patent Publication No. 2008-109697
Patent Document 4: Japanese Laid-Open Patent Publication No. 2009-278660
Patent Document 5: Japanese Laid-Open Patent Publication No. 2009-100116

In the technology of improving the receiving performance when there is interference from other cells in a case where components from some of the cells included in other cell interference are dominant, by receiving, by MIMO-MLD, both the signals from other cells and signals of the self-cell by considering both of these signals as antenna branches of MIMO, when transmission diversity such as STBC is performed, and an attempt is made to perform MLD by combining the self-cell and the other cell, there arises the problems that the number of symbols to be multiplexed increases and the processing amount of MLD becomes significantly high.

SUMMARY

According to a disclosed embodiment, in a wireless communication method for performing space block coding on a plurality of symbols at a base station, sending signals from a plurality of antennas of the base station, performing space block decoding on the signals received by a plurality of antennas at a mobile station, and estimating the plurality of symbols at the mobile station, the base station performs a precoding process beforehand on the plurality of symbols and then performs the space block coding and sends the signals from the plurality of antennas of the base station, and the mobile station performs the space block decoding on the signals received by the plurality of antennas of the mobile station, and then performs antenna combination and a deprecoding process on the signals, and estimates the plurality of symbols from the signals that have undergone the deprecoding process.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

Embodiments are described with reference to drawings.

First, a specific description is given of STBC. STBC is basically an encoding method referred to as Alamouti encoding. STBC may be called something else such as SFBC using two different frequency resources in a system such as OFDM, but these are all similarly applicable in the present embodiment.

When sending symbols $s_1$, $s_2$, the transmission signals are expressed by formula (1) with a matrix of time×transmitting antenna=2×2. Furthermore, in the Alamouti thesis, formula (2) is used. In either matrix of formula (1) or formula (2), the same method is constituted. In the following, a description is given with the use of formula (1). Incidentally, "*" expresses complex conjugation.

$$X = (s_\omega) = \begin{pmatrix} s_1 & -s_2^* \\ s_2 & s_1^* \end{pmatrix} \quad (1)$$

$$X = (s_\omega) = \begin{pmatrix} s_1 & s_2 \\ -s_2^* & s_1^* \end{pmatrix} \quad (2)$$

Here, when signals expressed by formula (1) are transmitted, assuming that the channel vectors (transmission path properties) of antennas 1 and 2 are $h_1$, $h_2$, and the reception signals of times 1 and 2 are $y_1$, $y_2$, when there is no noise, the reception signals are expressed by formula (3). Furthermore, formula (3) can be rewritten as formula (4).

$$\begin{pmatrix} y_1 \\ y_2 \end{pmatrix} = \begin{pmatrix} h_1 s_1 - h_2 s_2^* \\ h_1 s_2 + h_2 s_1^* \end{pmatrix} = \begin{pmatrix} s_1 & -s_2^* \\ s_2 & s_1^* \end{pmatrix} \begin{pmatrix} h_1 \\ h_2 \end{pmatrix} \quad (3)$$

$$\begin{pmatrix} y_1 \\ y_2^* \end{pmatrix} = \begin{pmatrix} h_1 s_1 - h_2 s_2^* \\ h_1^* s_2^* + h_2^* s_1 \end{pmatrix} = \begin{pmatrix} h_1 & -h_2 \\ h_2^* & h_1^* \end{pmatrix} \begin{pmatrix} s_1 \\ s_2^* \end{pmatrix} \quad (4)$$

From the above, the receiving process of multiplying formula (4) by a complex conjugate transpose of a channel matrix and dividing the symbols $s_1$, $s_2^*$ is expressed by formula (5). "*" expresses complex conjugate transpose.

$$\begin{pmatrix} h_1 & -h_2 \\ h_2^* & h_1^* \end{pmatrix}^+ \begin{pmatrix} y_1 \\ y_2^* \end{pmatrix} = \begin{pmatrix} h_1^* & h_2 \\ -h_2^* & h_1 \end{pmatrix} \begin{pmatrix} h_1 & -h_2 \\ h_2^* & h_1^* \end{pmatrix} \begin{pmatrix} s_1 \\ s_2^* \end{pmatrix} = (|h_1|^2 + |h_2|^2) \begin{pmatrix} s_1 \\ s_2^* \end{pmatrix} \quad (5)$$

Next, the cells constituted by plural base stations are collectively expressed. The receiving vector y(k) is expressed by formula (6a), and k expresses plural receiving antennas (for example, antennas 1 and 2) of a mobile station. A signal vector s(b) is expressed by formula (6b), and b expresses plural base stations (for example, including base station a). A channel matrix H(b,k) is expressed by formula (6c). Based on these, the reception signal of the signals transmitted from the plural base stations are expressed by formula (7). However, n(k) expresses the external noise such as noise of heat entering the receiving antenna k.

$$y(k) = \begin{pmatrix} y_1(k) \\ y_2(k)^* \end{pmatrix} \quad (6a)$$

$$s(b) = \begin{pmatrix} s_1(b) \\ s_2(b)^* \end{pmatrix} \quad (6b)$$

$$H(b, k) = \begin{pmatrix} h_1(b, k) & -h_2(b, k) \\ h_2(b, k)^* & h_1(b, k)^* \end{pmatrix} \quad (6c)$$

$$y(k) = \sum_b H(b, k) s(b) + n(k) \quad (7)$$

Based on the above, a STBC decode process of multiplying formula (7) by the complex conjugate transpose of a channel matrix h(b,k) is expressed by formula (8). ξ(a,k) expresses a signal after the receiving process has been performed on a signal from a base station a received with a receiving antenna k.

$$\xi(a, k) = \begin{pmatrix} \xi_1(a, k) \\ \xi_2(a, k)^* \end{pmatrix} \quad (8)$$

$$= H(a, k)^+ y(k)$$

-continued $$= \sum_b H(a,k)^+ H(b,k)s(b) + H(a,k)^+ n(k)$$

$$= H(a,k)^+ H(a,k)s(a) +$$

$$\sum_{b \neq a} H(a,k)^+ H(b,k)s(b) + H(a,k)^+$$

$$= (|h_1(a,k)|^2 + |h_2(a,k)|^2)s(a) +$$

$$\sum_{b \neq a} H(a,k)^+ H(b,k)s(b) + H(a,k)^+$$

Furthermore, by combining formula (8) with a receiving antenna, a signal. η(a) after the receiving process has been performed on a signal from a base station a received with plural receiving antennas of a mobile station is expressed by formula (9). $N_R$ expresses the number of antennas.

$$\xi(a) = \sum_{k=0}^{N_R-1} \xi(a,k) \qquad (9)$$

$$= \sum_{k=0}^{N_R-1} (|h_1(a,k)|^2 + |h_2(a,k)|^2)s(a) +$$

$$\sum_{k=0}^{N_R-1} \sum_{b \neq a} H(a,k)^+ H(b,k)s(b) +$$

$$\sum_{k=0}^{N_R-1} H(a,k)^+ n(k)$$

Here, by normalizing formula (9) with the receiving power of the first item on the right side of formula (9), formula (10) is obtained. The first item on the right side of formula (10) is a signal from the base station a that is a reception target, the second item on the right side of formula (10) is a signal from a base station that is not a reception target, and the third item on the right side of formula (10) is external noise.

$$\eta(a) = \frac{1}{\sum_{k=0}^{N_R-1}(|h_1(a,k)|^2 + |h_2(a,k)|^2)} \xi(a) \qquad (10)$$

$$= s(a) + \sum_{b \neq a} \frac{\sum_{k=0}^{N_R-1} H(a,k)^+ H(b,k)}{\sum_{k=0}^{N_R-1}(|h_1(a,k)|^2 + |h_2(a,k)|^2)} s(b) +$$

$$\frac{\sum_{k=0}^{N_R-1} H(a,k)^+ n(k)}{\sum_{k=0}^{N_R-1}(|h_1(a,k)|^2 + |h_2(a,k)|^2)}$$

Here, by defining A(a,b), B(a,b), E(a,b), and ñ by formulae (11) through (14), η(a) is expressed by formula (15).

$$A(a,b) = \frac{\sum_{k=0}^{N_R-1}(h_1(a,k)^* h_1(b,k) + h_2(a,k)h_2(b,k)^*)}{\sum_{k=0}^{N_R-1}(|h_1(a,k)|^2 + |h_2(a,k)|^2)} \qquad (11)$$

$$B(a,b) = \frac{\sum_{k=0}^{N_R-1}(-h_1(a,k)^* h_2(b,k) + h_2(a,k)h_1(b,k)^*)}{\sum_{k=0}^{N_R-1}(|h_1(a,k)|^2 + |h_2(a,k)|^2)} \qquad (12)$$

$$E(a,b) = \begin{pmatrix} A(a,b) & B(a,b) \\ -B(a,b)^* & A(a,b)^* \end{pmatrix} \qquad (13)$$

$$\tilde{n} = \frac{\sum_{k=0}^{N_R-1} H(a,k)^+ n(k)}{\sum_{k=0}^{N_R-1}(|h_1(a,k)|^2 + |h_2(a,k)|^2)} \qquad (14)$$

$$\eta(a) = s(a) + \sum_{b \neq a} E(a,b)s(b) + \tilde{n} \qquad (15)$$

Next, a description is given of preliminary precoding. A vector u(a) in a base station a where two complex symbols such as QPSK and 16QAM are combined, is expressed by formula (16a). In formula (16a), to simplify the handling of the formula, one side is the complex conjugate. It is assumed that the transmission signals s(a), s(b) before STBC encoding from plural base stations a and b are not symbols per se expressing signal points such as 16QAM, but are signals precoded by precoding matrix W(a),W(b) beforehand at base stations a and b. That is to say, the transmission signals s(a), s(b) are defined by formulae (16b) and (16c).

$$u(a) = \begin{pmatrix} u_1(a) \\ u_2^*(a) \end{pmatrix} \qquad (16a)$$

$$s(a) = W(a)u(a) \qquad (16b)$$

$$s(b) = W(b)u(b) \qquad (16c)$$

When a deprecoding process is performed on a signal on which branch combination including a normalization process has been performed after STBC decoding at the mobile station on the receiving side, a signal ζ(a) expressed by formula (17) is obtained from formulae (15), (16b), and (16c).

$$\zeta(a) = \begin{pmatrix} \zeta_1(a) \\ \zeta_2^*(a) \end{pmatrix} \qquad (17)$$

$$= W(a)^+ \eta(a)$$

$$= u(a) + \sum_{b \neq a} W(a)^+ E(a,b)W(b)u(b) + W(a)^+ \tilde{n}$$

Here, formula (18) is satisfied for E(a,b).

$$E(a,b)^+ E(a,b) = \begin{pmatrix} A(a,b)^* & -B(a,b) \\ B(a,b)^* & A(a,b) \end{pmatrix} \begin{pmatrix} A(a,b) & B(a,b) \\ -B(a,b)^* & A(a,b)^* \end{pmatrix} \qquad (18)$$

$$= (|A(a,b)|^2 + |B(a,b)|^2)\begin{pmatrix} 1 & 0 \\ 0 & 1 \end{pmatrix}$$

Accordingly, $E(a,b)/(|A(a,b)|^2+|B(a,b)|^2)^{1/2}$ is a unitary matrix.

Configuration of Base Station Device

Figure 1:
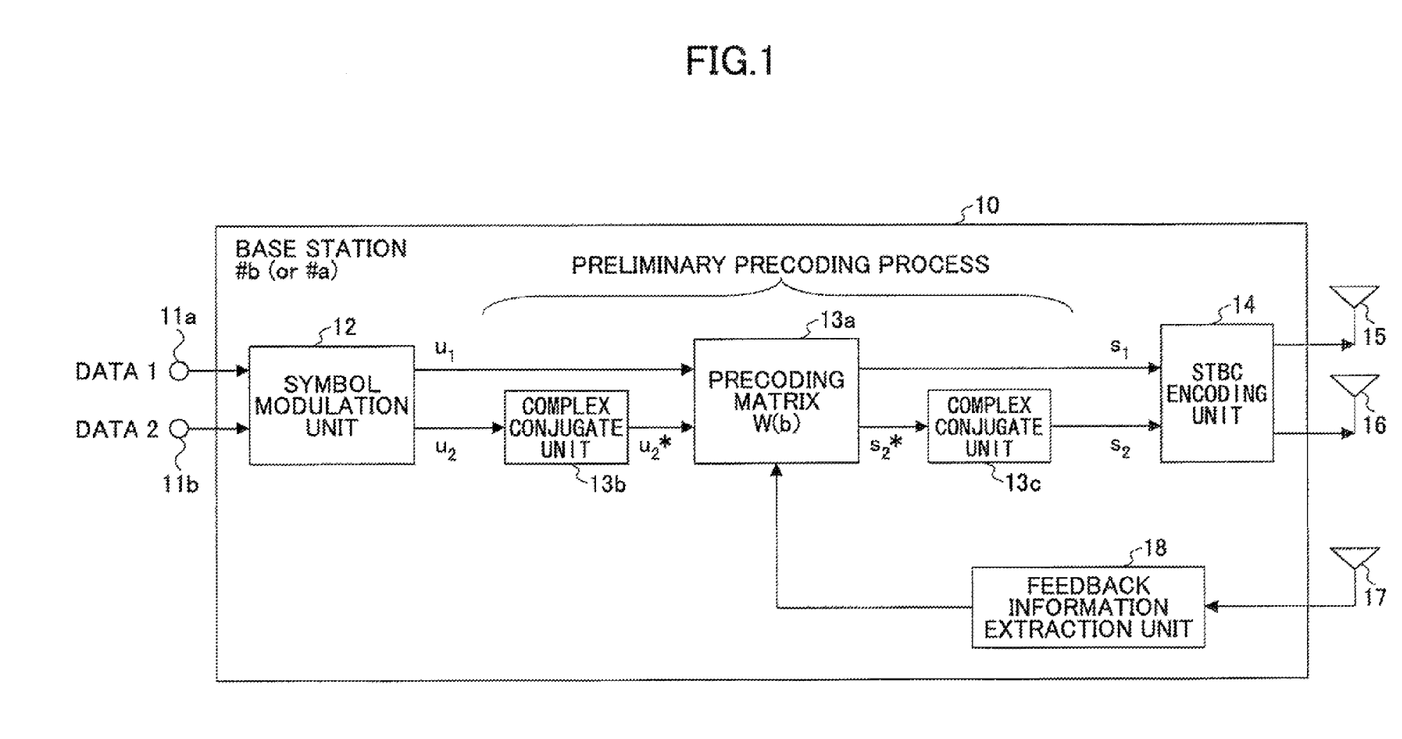
FIG. 1 illustrates a transmission unit of a base station device according to one embodiment.

FIG. 1 illustrates a transmission unit of a base station device according to one embodiment. In FIG. 1, in terminals 11a and 11b of a transmission unit 10, data 1, 2 is input from a base band processing unit of the base station device, and the data 1, 2 is supplied to a symbol modulation unit 12. The symbol modulation unit 12 performs symbol modulation such as QPSK or 16QAM on the above data 1, 2, and generates signal vectors $u_1$, $u_2$.

In the present embodiment, at a precoding matrix 13a and complex conjugate units 13b, 13c, a preliminary precoding process is executed. However, the complex conjugate units 13b, 13c are not always needed.

The signal vector $u_1(b)$ is supplied to the precoding matrix 13a, and the signal vector $u_2(b)$ is subjected to complex conjugation at the complex conjugate unit 13b and is supplied to the precoding matrix 13a as a signal vector $u_2^*(b)$. At the precoding matrix 13a, an operation expressed by formula (16c) is performed on the signal u(b), and a signal s(b) constituted by vectors $s_1(b)$, $s_2^*(b)$ is generated. In signals u(b), s(b), and a precoding matrix W(b), it is assumed that base station b includes base station a. Vector $s_2^*(b)$ is subjected to complex conjugation at the complex conjugate unit 13c, and is output as a vector $s_2(b)$. An STBC encoding unit 14 performs STBC encoding on the vectors $s_1(b)$, $s_2(b)$, and the signals that have undergone STBC encoding are sent from antennas 15, 16 to the mobile station.

Furthermore, an antenna 17 receives signals sent from the mobile station, and supplies the signals to a feedback information extraction unit 18. The feedback information extraction unit 18 extracts a precoding matrix W(b) as feedback information sent from the mobile station, and supplies the precoding matrix W(b) to the precoding matrix 13a. The antenna 17 may act as either one of the antennas 15 or 16.

Configuration of Mobile Station Device

Figure 2:
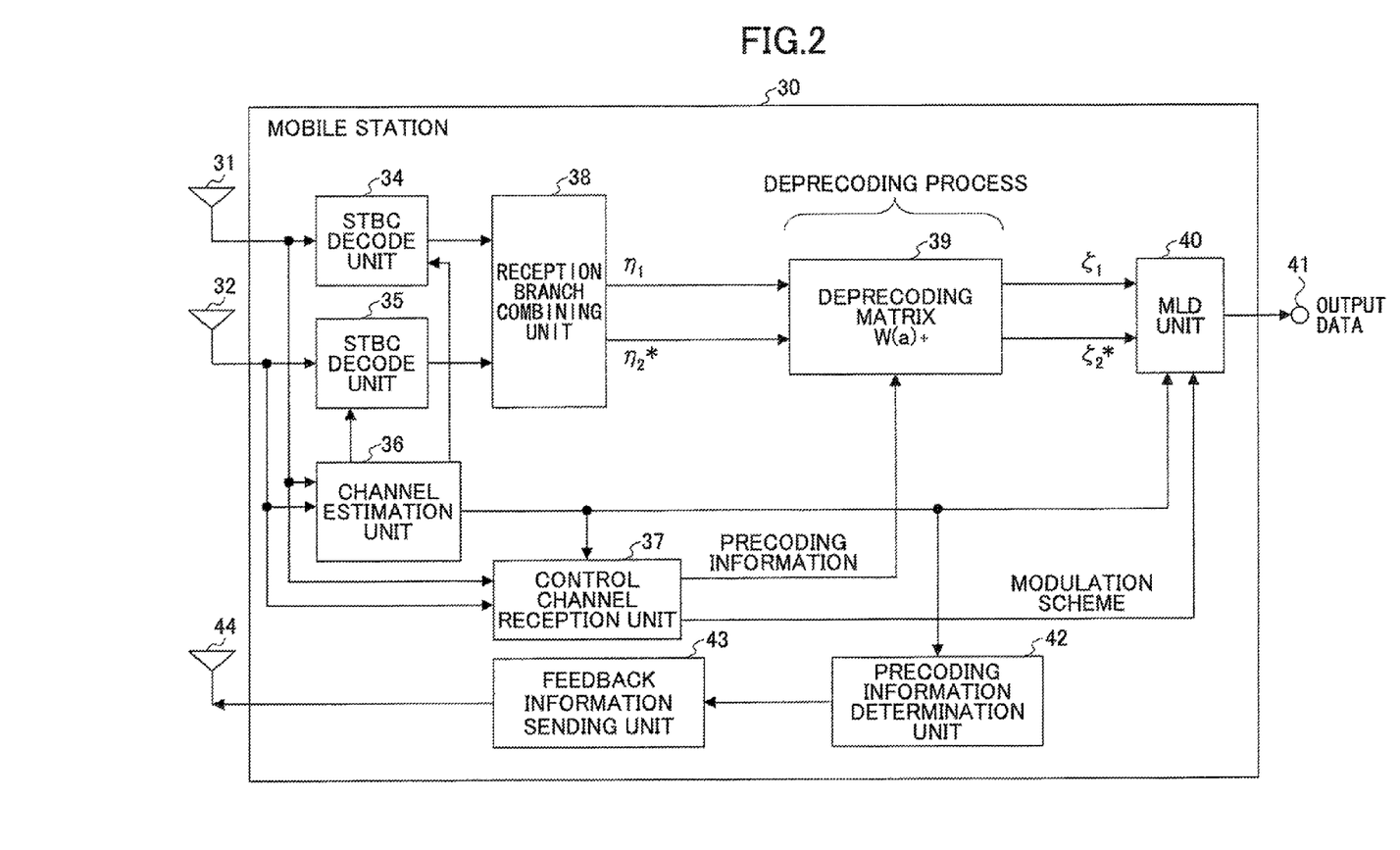
FIG. 2 illustrates a configuration of a mobile station device according to one embodiment.

FIG. 2 illustrates a configuration of a mobile station device according to one embodiment. In FIG. 2, antennas 31, 32 of a mobile station 30 receive signals sent from the base station device, and supplies the signals to STBC decode units 34, 35, a channel estimation unit 36, and a control channel reception unit 37.

The channel estimation unit 36 detects, from the reception signals of the two systems, for example, known pilot signals superposed on a transmission signal to estimate channel vectors (propagation path properties) of the antennas 31, 32 and generate a channel matrix H(b,k) indicated by the formula (6c), and supplies the channel matrix H(b,k) to the STBC decode units 34, 35, the control channel reception unit 37, and an MLD unit 40.

The STBC decode unit 34 generates a signal $\xi(a,1)$ by performing a process of receiving a signal received by the antenna 31, and supplies the signal $\xi(a,1)$ to a reception branch combining unit 38. The STBC decode unit 35 generates a signal $\xi(a,2)$ by performing a process of receiving a signal received by the antenna 32, and supplies the signal $\xi(a,2)$ to the reception branch combining unit 38.

The reception branch combining unit 38 generates a signal $\eta(a)$ constituted by signal vectors $\eta_1(a)$, $\eta_2^*(a)$ by combining the signal $\xi(a,1)$ and the signal $\xi(a,2)$, and supplies the signal $\eta(a)$ to a deprecoding matrix 39. In the present embodiment, a deprecoding process is performed at the deprecoding matrix 39; however, complex conjugate units may be provided before and after the deprecoding matrix 39, similar to the precoding matrix 13a.

Incidentally, $\xi(a)$, $\eta(a)$, and $\zeta(a)$ may be expressed by the following formulae (19a), (19b), and (19c) respectively.

$$\xi(a) = \begin{pmatrix} \xi_1(a) \\ \xi_2^*(a) \end{pmatrix} \qquad (19a)$$

$$\eta(a) = \begin{pmatrix} \eta_1(a) \\ \eta_2^*(a) \end{pmatrix} \qquad (19b)$$

$$\zeta(a) = \begin{pmatrix} \zeta_1(a) \\ \zeta_2^*(a) \end{pmatrix} \qquad (19c)$$

At the deprecoding matrix 39, the operation expressed by formula (17) is performed on $\eta(a)$, and signal vectors $\zeta 1(a)$, $\zeta 2^*(a)$ constituting the signal $\zeta(a)$ obtained as a result of the operation is supplied to an MLD unit 40.

The MLD unit 40 performs signal separation using MLD. That is to say, the MLD unit 40 uses the signal $\zeta(a)$, a channel matrix H(b,k) obtained at the channel estimation unit 36, and the modulation scheme information obtained at the control channel reception unit 36 to compare the signal obtained as an operation result of formula (17) and replicas of signal candidate points, and selects the signal candidate point having the highest likelihood to perform symbol demodulation of QPSK or 16QAM, etc. The resultant data is output from a terminal 41.

The channel estimation unit 36 extracts, from reception signals of the antennas 31, 32, modulation scheme information and deprecoding information transmitted by a control channel, supplies the extracted deprecoding information to the deprecoding matrix 39, and supplies the extracted modulation scheme information to the MLD unit 40.

A precoding information determination unit 42 determines a precoding matrix for a base station that is a reception target or base stations that are not reception targets, from a channel matrix H(b,k) supplied from the channel estimation unit 36, and sends the above precoding matrix as feedback information from a feedback information sending unit 43 to the base station via an antenna 44. The antenna 44 may act as either one of the antennas 31 or 32.

The MLD unit 40 uses MLD to perform a process of determining a transmission symbol from signals obtained after deprecoding. First, a description is given of a case of performing MLD only on signals from the base station that is a reception target (self cell). For example, when determining a transmission signal point of a signal from a base station that is a reception target by simply setting a signal from a base station that is not a reception target (other cell) as "unknown", the transmission symbol replica of the self cell is set as $u_{rep}(a)$, $|\zeta(a) - u_{rep}(a)|$ is calculated for all possibilities of $u_{rep}(a)$, and the minimum calculation value $u_{rep}(a)$ is detected as a transmission signal point.

Next, a description is given of MLD combining a signal from the base station that is a reception target (self cell) and signals from base stations that are not the reception target (other cell). When MLD is performed by including other cell signals, calculation is performed by formula (20) on all possible combinations ($u_{rep}(a)$, $u_{rep}(b)$, $u_{rep}(b')$) of replicas of the self cell $u_{rep}(a)$ and signal point replicas of the other cells $u_{rep}(b)$, $u_{rep}(b')$.

$$\left| \zeta(a) - u_{rep}(a) - \sum_{b \neq a} W(a)^+ E(a, b) W(b) u_{rep}(b) \right|^2 \qquad (20)$$

Then, the self cell transmission symbol is determined as $u_{rep}(a)$ from the minimum value of the result of formula (20), ($u_{rep}(a)$, $u_{rep}(b)$, $u_{rep}(b')$).

Next, a description is given of MLD combining a signal from the base station that is a reception target (self cell) and a signal from one base station that is not the reception target (other cell). In this case, calculation is performed by formula (21) on all possible combinations ($u_{rep}(a)$, $u_{rep}(b)$) of replicas of the self cell $u_{rep}(a)$ and signal point replicas of the other cell $u_{rep}(b)$.

$$|\zeta(a) - u_{rep}(a) - W(a)^* E(a,b) W(b) u_{rep}(b)|^2 \quad (21)$$

Then, the self cell transmission symbol is determined as $u_{rep}(a)$ from the minimum value of the result of formula (21), ($u_{rep}(a), u_{rep}(b)$).

First Embodiment

Figure 3:
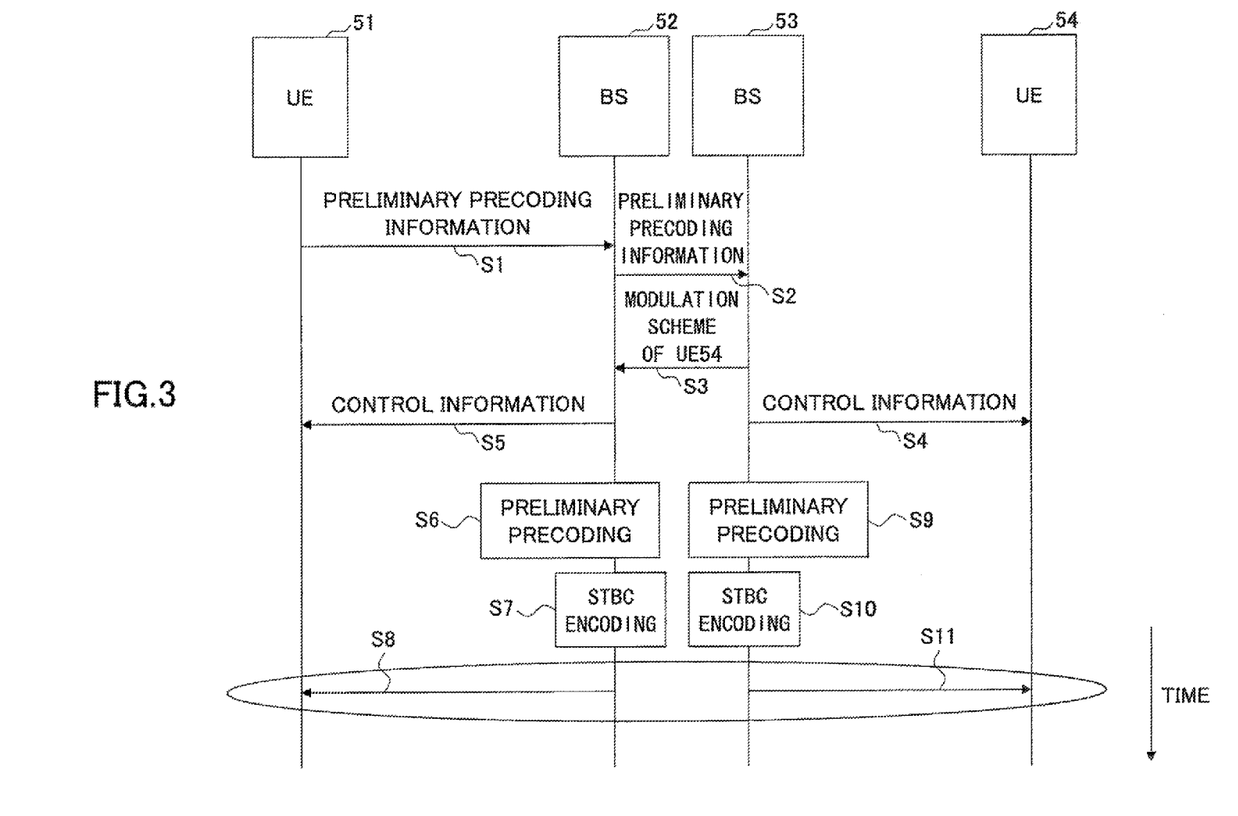
FIG. 3 illustrates a sequence of a communication system according to a first embodiment.

FIG. 3 illustrates a sequence of a communication system according to a first embodiment. In the first embodiment, a mobile station (UE: User Equipment) 51 uses a base station (BS: Base Station) 52 as the base station that is a reception target, and uses a base station 53 as a base station that is not the reception target. A mobile station 54 is communicating with the base station 53.

Furthermore, in this case, it is assumed that the base station 53 is a small sized base station such as home eNodeB, the base station 52 is a regular base station forming a cell having a wide range, the cell formed by the base station 53 is located in the wide range cell of the base station 52, and the mobile station 51 is unable to connect to the base station 53.

In the first embodiment, the mobile station 51 sets the precoding matrix W(a) for the base station 52 that is a reception target as W(a)=1
and sets the precoding matrix W(b) for the base station 53 that is not the reception target as $$W(b) = [1/(|A(a,b)|^2 + |B(a,b)|^2)^{1/2}] \times E(a,b)^+$$

When there is a base station that is not a reception target other than the base station 53, the precoding matrix W(b) is also set for such a base station that is not a reception target.

In FIG. 3, the mobile station 51 sends the precoding matrix W(b) to be applied by the base station 53 as feedback information to the base station 52 (step S1), and the base station 52 sends the above precoding matrix W(b) to the base station 53 (step S2). The base station 53 sends the modulation scheme to be applied to the mobile station 54 to the base station 52 (step S3). The base station 53 includes the modulation scheme to be applied to the mobile station 54 and the precoding matrix W(b) in the control information, and sends the control information to the mobile station 54 (step S4).

The base station 52 sends control information needed for data reception to the mobile station 51 (step S5). The mobile station 51 performs MLD including signals of the base station 52, and therefore the base station 52 sends, to the mobile station 51, the control information including the modulation scheme of the mobile station 54 other than the modulation scheme to be applied to the mobile station 51. In a regular packet communication system, in order to receive packets, the control information generally includes plural types of information other than the above, such as information indicating the allocation of packet data on the wireless resource and information relevant to the encoding of error correction codes. Furthermore, in a system where the base station 52 always determines preliminary precoding according to feed back information of preliminary precoding from the mobile station 51, the preliminary precoding information does not need to be explicitly sent in the control information at step S5. However, in a case where the feedback information is erroneously received at the receiving terminal of the base station 52, the fed back preliminary precoding of the mobile station 51 may be different from the precoding actually applied at the base station 52. In this case, the preliminary precoding explicitly applied in the control information of step S5 may be reported.

Accordingly, the base station 52 performs preliminary precoding of W(a)=1 in step S6, performs STBC encoding in step S7, and performs transmission to the mobile station 51 in step S8. Furthermore, the base station 53 performs precoding by W(b) in step S9, and then performs STBC encoding in step S10, and performs transmission to the mobile station 54 in step S11. In steps S8 and S11, signals are transmitted from the base stations 52 and 53 by the same frequency and time.

In the precoding matrix W(b), E(a,b), A(a,b), B(a,b), etc., are all amounts that are calculated from the value of a channel matrix H(b,k), and therefore the estimation value may be used for calculation with the precoding information determination unit 42 of the mobile station. The most simple method is to use information expressing the components of the precoding matrix with direct finite quantized bit numbers as the feedback information. However, in direct feedback, the amount of feedback information increases. Therefore, in order to further reduce feedback, it is possible to perform a method of preparing plural predetermined precoding matrices; associating these precoding matrices with plural indices; selecting, with the precoding determination unit 42 of the mobile station, the matrix closest to the above W(b) calculated from the channel estimation value from among the predetermined plural precoding matrices; and feeding back the index.

In this case, the signal $\zeta(a)$, which is obtained by performing precoding at the mobile station 51, is expressed by formula (22).

$$\zeta(a) = W(a)^+ \eta(a) \quad (22)$$

$$= u(a) + \sum_{b \neq a} \sqrt{|A(a,b)|^2 + |B(a,b)|^2}\, u(b) + W(a)^+ n^\sim$$

With formula (22), the interference coefficient matrix of all base stations that are not the reception target may be diagonalized. In formula (22), a component $u_i(a)$ of the transmitting antenna i(=1,2) of the base station that is the reception target includes the component $u_i(b)$ of the transmitting antenna i of the base station that is not the reception target and is independently received, and is expressed by formula (23). Furthermore, in formula (23), the coefficients of $u_i(b)$ are all real numbers. Therefore, as indicated by formulae (24) and (25), the real number part Re$\zeta$(a) and the imaginary number part Im$\zeta$(a) are independent from each other.

$$\zeta_i(a) = u_i(a) + \sum_{b \neq a} \sqrt{|A(a,b)|^2 + |B(a,b)|^2}\, u_i(b) + (W(a)^+ n^\sim)_i \quad (23)$$

$$\mathrm{Re}\zeta_i(a) = \quad (24)$$

$$\mathrm{Re}u_i(a) + \sum_{b \neq a} \sqrt{|A(a,b)|^2 + |B(a,b)|^2}\, \mathrm{Re}u_i(b) + \mathrm{Re}(W(a)^+ n^\sim)_i$$

$$\mathrm{Im}\zeta_i(a) = \quad (25)$$

$$\mathrm{Im}u_i(a) + \sum_{b \neq a} \sqrt{|A(a,b)|^2 + |B(a,b)|^2}\, \mathrm{Im}u_i(b) + \mathrm{Im}(W(a)^+ n^\sim)_i$$

Accordingly, it is easy for the mobile station 51 to perform signal division by MLD and receive the signals. As a matter of simplification, a model having two cells is considered, including one of each of a base station a that is a reception target and a base station b that is not a reception target. A distance d( ) between a replica and an actual measurement value is obtained by formula (26). The first item in the absolute value on the right side of formula (26) expresses the actual measurement value, and the second item and the third item express replicas.

$$d(Reu_i(a), Reu_i(b)) = |Re\zeta_i(a) - Reu_i(a) - \sqrt{|A(a,b)|^2 + |B(a,b)|^2} Reu_i(b)|^2 \quad (26)$$

Here, the combination $(Reu_i(a)_{min}, Reu_i(b)_{min})$ of transmission symbols where the distance d( ) is minimum is searched for among the combinations of $(Reu_i(a), Reu_i(b))$, and $Reu_i(a)_{min}$ is determined as the signal point. As for an imaginary part $Im\zeta(a)$, similar to the actual number part $Re\zeta(a)$, the combination $(Imu_1(a)_{min}, Imu_1(b)_{min})$ of transmission symbols where the distance d( ) is minimum is determined as the signal point.

For the mobile station 54, the signals of the base station 52 are not diagonalized, and therefore MLD is not easily performed. In this case, for example, the mobile station 54 considers other cell signals from the base station 52, etc., as unknown noise, and performs an MLD process only on the self cell signals from the base station 53.

Second Embodiment

Figure 4:
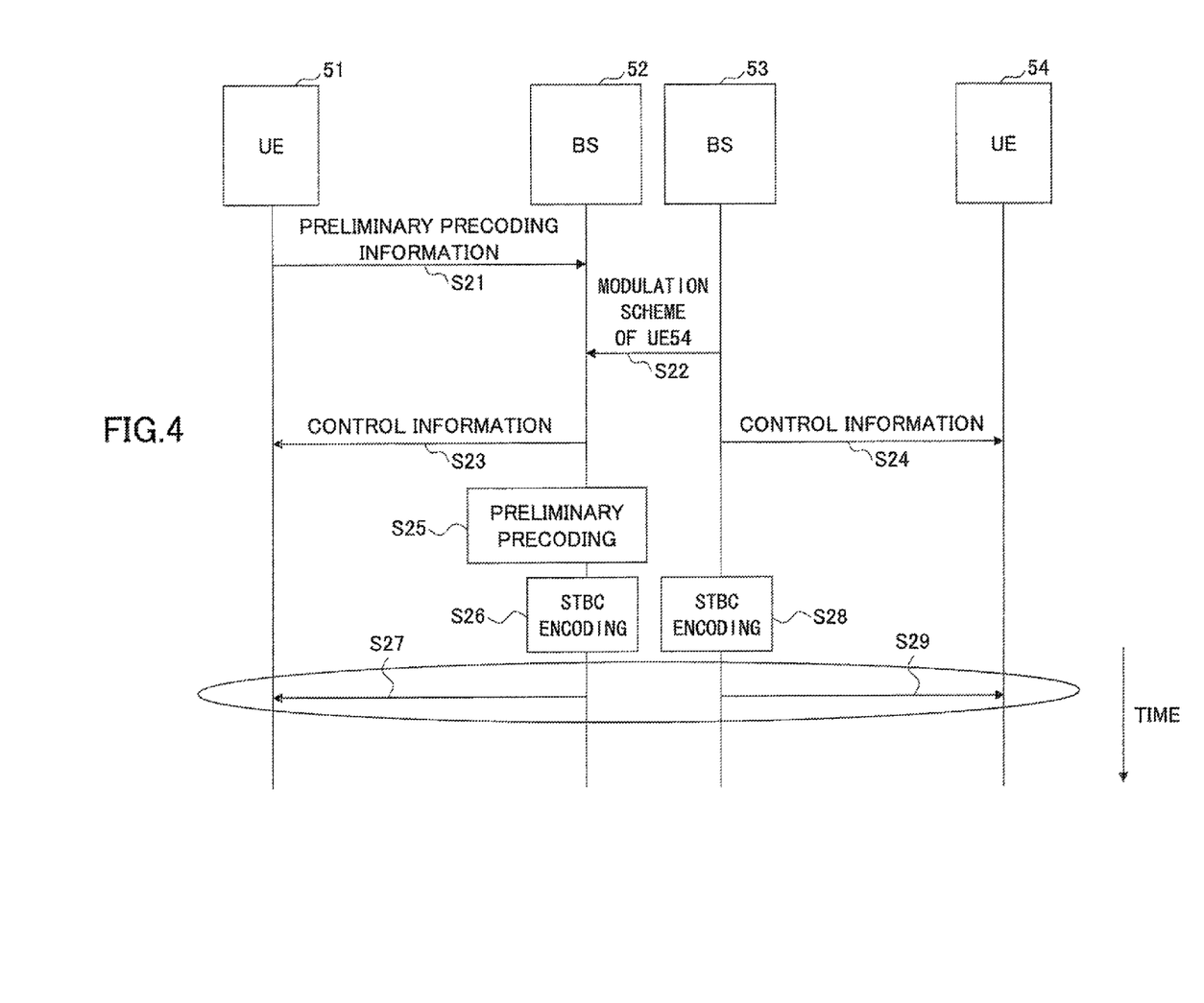
FIG. 4 illustrates a sequence of a communication system according to a second embodiment.

FIG. 4 illustrates a sequence of a communication system according to a second embodiment. In the second embodiment, a mobile station 51 uses a base station 52 as the base station that is a reception target, and uses a base station 53 as a base station that is not the reception target. A mobile station 54 is communicating with the base station 53.

Furthermore, in this case, it is assumed that the base station 53 is a small sized base station such as home eNodeB, the base station 52 is a regular base station forming a cell having a wide range, the cell formed by the base station 53 is located in the wide range cell of the base station 52, and the mobile station 51 is unable to connect to the base station 53.

In the second embodiment, the mobile station 51 performs diagonalization only on one base station 53 that is not a reception target. In formula (17), by setting the variable for which a total sum is obtained as "c", formula (27) is obtained.

$$\zeta(a) = W(a)^+ \eta(a) \quad (27)$$

$$= u(a) + \sum_{c \neq a} W(a)^+ E(a,c) W(c) u(c) + W(a)^+ n^\sim$$

In formula (27), assuming that $$W(a) = E(a,b)$$

$$W(b) = 1 \text{ where}, b \neq a,$$

formula (28) is obtained.

$$\zeta(a) = W(a)^+ \eta(a) \quad (28)$$

$$= u(a) + \sqrt{|A(a,b)|^2 + |B(a,b)|^2}\, u(b) + \sum_{c \neq a,b} W(a)^+ A(a,c) W(c) u(c) + W(a)^+ n^\sim$$

Formula (28) includes unnecessary components from a base station c that is not a reception target in the third item as $(\Sigma W(a)+A(a,c)u(c))$, but if the third item is ignored, formula (28) is the same as formula (22). Therefore, the combination $(Re\, u_i(a)_{min}, Re\, u_i(b)_{min})$ of transmission symbols where the distance d( ) obtained by formula (23) is minimum is searched for, and $Re\, u_i(a)_{min}$ is determined as the signal point.

In the present embodiment, even when there are multiple base stations, only a particular base station is the target of diagonalization. In an actual system, for example, when there are plural base stations in the surrounding area, by selecting the base station having the maximum receiving power among the plural base stations, MLD may be performed by diagonalizing the dominant interfering components, and is thus effective. In order to realize such a configuration, for example, at the feedback information sending unit 43 of the mobile station, the receiving power of the respective base stations c are estimated by formula (29), from the estimation result of the receiving channel from the base stations estimated at the channel estimation unit 36.

$$\sum_{k=0}^{N_R - 1} (|h_1(c,k)|^2 + |h_2(c,k)|^2) \quad (29)$$

The base station c having the maximum receiving power obtained as above is determined as the base station b that is the target of diagonalization. Furthermore, to stably estimate the average power, a cell having the maximum average power, which is obtained by averaging results obtained by performing the above power calculation on plural wireless resources, may be selected.

In FIG. 4, the mobile station 51 sends the precoding matrix W(a)=E(a,b) as feedback information to the base station 52 (step S21). The base station 53 sends a modulation scheme to be applied to the mobile station 54 to the base station 52 (step S22). The base station 52 sends, to the mobile station 51, control, information including the modulation schemes to be applied to the mobile stations 51 and 54 (step S23). The base station 53 sends, to the mobile station 54, control information including the modulation scheme to be applied to the mobile station 54 (step S24).

The base station 52 performs precoding of W(a) at step S25, then performs STBC encoding at step S26, and performs transmission to the mobile station 51 (step S27). The base station 53 performs STBC encoding at step S28 without performing precoding, and performs transmission to the mobile station 54 at step S29. In steps S27 and S29, signals are transmitted from the base stations 52 and 53 by the same frequency and time.

The feature of the present embodiment is that the base station 52 that is the reception target only performs deprecoding for the mobile station 51. There is no need to send precoding information to the base station 53, etc., that is not a reception target. Furthermore, there is no need fox the base station 53 that is not the reception target to send precoding information to the mobile station 54, etc.

In the above first and second embodiments, when the MLD unit 40 performs signal division, even when the MLD involves searching all patterns, it is possible to perform the search only with the combination of $(Reu_i(a), Reu_i(b))$ and the combination of $(Imu_i(a), Imu_i(b))$. In a system where all transmission symbols are 64QAM, there are 8×8=64 instances. For the combinations of $(Reu_i(a), Reu_i(b))$ and the combinations of $(Imu_i(a), Imu_i(b))$, the calculation is performed for the data of two transmitting antennas (i=1,2), and therefore the overall number of times of calculating the distance is 64×2×2=256 times.

Meanwhile, in the conventional method where precoding is not performed, in the respective transmitting antenna components of $$\eta(a)=s(a)+E(a,b)s(b)+W(a)+n\sim$$

all signal components of base stations that are not reception targets are multiplexed. Thus, when the searching is performed for all combinations, there are 64 instances for $s_1(a)$, $s_2(a)$, $s_1(b)$, $s_2(b)$ of two transmitting antennas (i=1,2), respectively, and therefore the total number of times of calculating the distance is 64×64×64×64=16,777,216 times. In the above embodiments, the computing functions needed for one distance calculation are reduced more than in the conventional technology, and with the above embodiments, MLD reception is possible with a significantly small processing amount.

In the above embodiments, STBC is taken as an example, using the degree of freedom of time×antenna. In an OFDM system, SFBC is used in a case of using a similar transmission diversity method using the degree of freedom of frequency× antenna with the use of plural sub carriers. However, by replacing the plural times with plural sub carriers, this case is applicable in the same manner as STBC. The method is not limited to the above embodiments.

According to the present embodiment, the number of symbols to be multiplexed is reduced and the processing amount of signal division is reduced.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for performing wireless communication, the method comprising:
    performing a precoding process beforehand on a plurality of symbols at a base station;
    performing space block coding on the plurality of symbols at the base station after the precoding process;
    sending signals from a plurality of antennas of the base station;
    performing space block decoding on the signals received by a plurality of antennas at a mobile station;
    performing antenna combination and a deprecoding process on the signals at the mobile station after the signals have undergone the space block decoding;
    estimating the plurality of symbols at the mobile station from the signals that have undergone the deprecoding process;
    determining, at the mobile station, feedback information of the precoding process for one of a base station that is not a reception target and a base station that is the reception target, so that interference of the base station that is not the reception target with the base station that is the reception target is diagonalized with the signals that have undergone the deprecoding process, and sending the feedback information to the one of the base station that is not the reception target and the base station that is the reception target; and
    performing, at the one of the base station that is not the reception target and the base station that is the reception target, the precoding process based on the feedback information from the mobile station.

2. The method according to claim 1, further comprising:
    determining, at the mobile station, the feedback information of the precoding process so that interference of a base station, which has highest interference among a plurality of the base stations that are not the reception target, is diagonalized.

3. The method according to claim 1, further comprising:
    performing the precoding process including a process of obtaining a complex conjugate for one of two of the symbols, and multiplying the complex conjugate by a unitary matrix.

4. The method according to claim 3, further comprising:
    performing the space block coding that is spatiotemporal block coding.

5. A wireless communication system comprising:
    a precoding unit included in a base station, configured to perform a precoding process beforehand on a plurality of symbols;
    an encode unit included in the base station, configured to perform space block coding on the plurality of symbols that have undergone the precoding process;
    a send unit included in the base station, configured to send signals from a plurality of antennas of the base station;
    a space block decoding unit included in a mobile station, configured to perform space block decoding on the signals received by a plurality of antennas of the mobile station;
    a process unit included in the mobile station, configured to perform antenna combination and a deprecoding process on the signals received by the plurality of antennas of the mobile station, after the signals have undergone the space block decoding;
    an estimate unit included in the mobile station, configured to estimate the plurality of symbols from the signals that have undergone the deprecoding process;
    a feedback information determination send unit included in the mobile station, configured to determine feedback information of the precoding process for one of a base station that is not a reception target and a base station that is the reception target, so that interference of the base station that is not the reception target with the base station that is the reception target is diagonalized with the signals that have undergone the deprecoding process, and send the feedback information to the one of the base station that is not the reception target and the base station that is the reception target; and
    a set unit included in the base station, configured to receive the feedback information sent from the mobile station, extract the precoding process from the feedback information, and set the precoding process in the precoding unit.

6. A base station in a wireless communication system, the base station comprising:
    a precoding unit configured to perform a precoding process beforehand on a plurality of symbols;
    an encode unit configured to perform space block coding on output signals of the precoding unit;
    a plurality of antennas configured to send output signals of the encode unit, the output signals of the encode unit being received by a plurality of antennas at a mobile station, subjected to space block decoding and a deprecoding process at the mobile station, and used for estimating the plurality of symbols at the mobile station; and a set unit configured to receive feedback information of the precoding process sent from the mobile station, extract the precoding process from the feedback information, and set the precoding process in the precoding unit, wherein the feedback information of the precoding process is determined at the mobile station for one of a base station that is not a reception target and a base station that is the reception target, so that interference of the base station that is not the reception target with the base station that is the reception target is diagonalized with the signals that have undergone the deprecoding process.

7. A mobile station in a wireless communication system, the mobile station comprising:
   a decode unit configured to perform space block decoding on signals received with a plurality of antennas of the mobiles station, the signals being obtained by performing space block coding on a plurality of symbols at a base station and sent from a plurality of antennas of the base station;
   an antenna combination unit configured to perform antenna combination on output signals of the decode unit;
   a deprecoding unit configured to perform a deprecoding process on output signals of the antenna combination unit;
   an estimation unit configured to estimate the plurality of symbols from output signals of the deprecoding unit; and
   a feedback information determination send unit configured to determine feedback information of the precoding process for a base station that is not a reception target, so that interference of the base station that is not the reception target with a base station that is the reception target is diagonalized with the signals that have undergone the deprecoding process, and send the feedback information to the base station that is not the reception target.

8. The mobile station according to claim 7, wherein
the feedback information determination send unit is configured to determine the feedback information of the precoding process for the base station that is the reception target, so that interference of the base station that is not the reception target with the base station that is the reception target is diagonalized with the signals that have undergone the deprecoding process, and send the feedback information to the base station that is the reception target.

9. The mobile station according to claim 8, wherein
the mobile station determines the feedback information of the precoding process so that interference of a base station, which has highest interference among a plurality of the base stations that are not the reception target, is diagonalized.

* * * * *